United States Patent
Okamura

(10) Patent No.: US 7,519,219 B2
(45) Date of Patent: Apr. 14, 2009

(54) METHOD AND PROGRAM FOR CORRECTING FACIAL IMAGE AND RECORDING MEDIUM

(75) Inventor: Koki Okamura, Saitama (JP)

(73) Assignee: Fujifilm Corporation, Tokyo (JP)

(*) Notice: Subject to any disclaimer, the term of this patent is extended or adjusted under 35 U.S.C. 154(b) by 722 days.

(21) Appl. No.: 10/766,922

(22) Filed: Jan. 30, 2004

(65) Prior Publication Data
US 2004/0196292 A1 Oct. 7, 2004

(30) Foreign Application Priority Data
Feb. 13, 2003 (JP) ............... 2003-035302

(51) Int. Cl.
*G09G 5/00* (2006.01)
(52) U.S. Cl. ............... 382/167; 382/162; 358/518; 358/519; 358/520; 358/521; 358/522; 358/523; 345/589; 345/590; 345/591; 345/592; 345/593; 345/594; 345/595; 345/596; 345/597; 345/598; 345/599; 345/600; 345/601; 345/602; 345/603; 345/604; 345/605
(58) Field of Classification Search ............... 382/162, 382/167; 345/589–605; 358/518–523
See application file for complete search history.

(56) References Cited

U.S. PATENT DOCUMENTS

| | | | | |
|---|---|---|---|---|
| 5,130,935 A | * | 7/1992 | Takiguchi | ............ 382/167 |
| 5,490,245 A | * | 2/1996 | Wugofski | ............ 715/837 |
| 6,009,209 A | | 12/1999 | Acker et al. | |
| 6,184,860 B1 | * | 2/2001 | Yamakawa | ............ 715/823 |
| 6,285,410 B1 | | 9/2001 | Marni | |
| 7,002,546 B1 | * | 2/2006 | Stuppi et al. | ............ 345/102 |
| 2001/0005222 A1 | | 6/2001 | Yamaguchi | |

FOREIGN PATENT DOCUMENTS

| | | |
|---|---|---|
| GB | 2 365 648 A | 2/2002 |
| JP | 11-017969 | 1/1999 |
| JP | 11-250227 | 9/1999 |

OTHER PUBLICATIONS

"Adobe Photoshop 7.0: Classroom in a Book." 2002, Adobe Systems Inc., pp. 89-92, 104-125, 201-211, and 229-245.*
European Search Report dated Mar. 22, 2007.

* cited by examiner

*Primary Examiner*—Jingge Wu
*Assistant Examiner*—John W Lee
(74) *Attorney, Agent, or Firm*—McGinn IP Law Group, PLLC

(57) ABSTRACT

A facial image photographed by a digital camera is downloaded to a PC. When a facial image correction program starts, a correction window and a correction item selection window open on a monitor. When a user opens the facial image in the correction window, a pixel extraction circuit extracts pixels representing a skin area, an eye area, a teeth area, and a hair area from the facial image. Correction items to be performed are determined in the correction item selection window. A cursor position detection circuit detects the position of a cursor in the correction window. When the cursor is in one of the areas, a facial image correction circuit judges whether the correction item corresponding to the area is selected. If the corresponding correction item is selected, the facial image correction circuit subjects a pixel pointed by the cursor to predetermined correction processing.

18 Claims, 5 Drawing Sheets

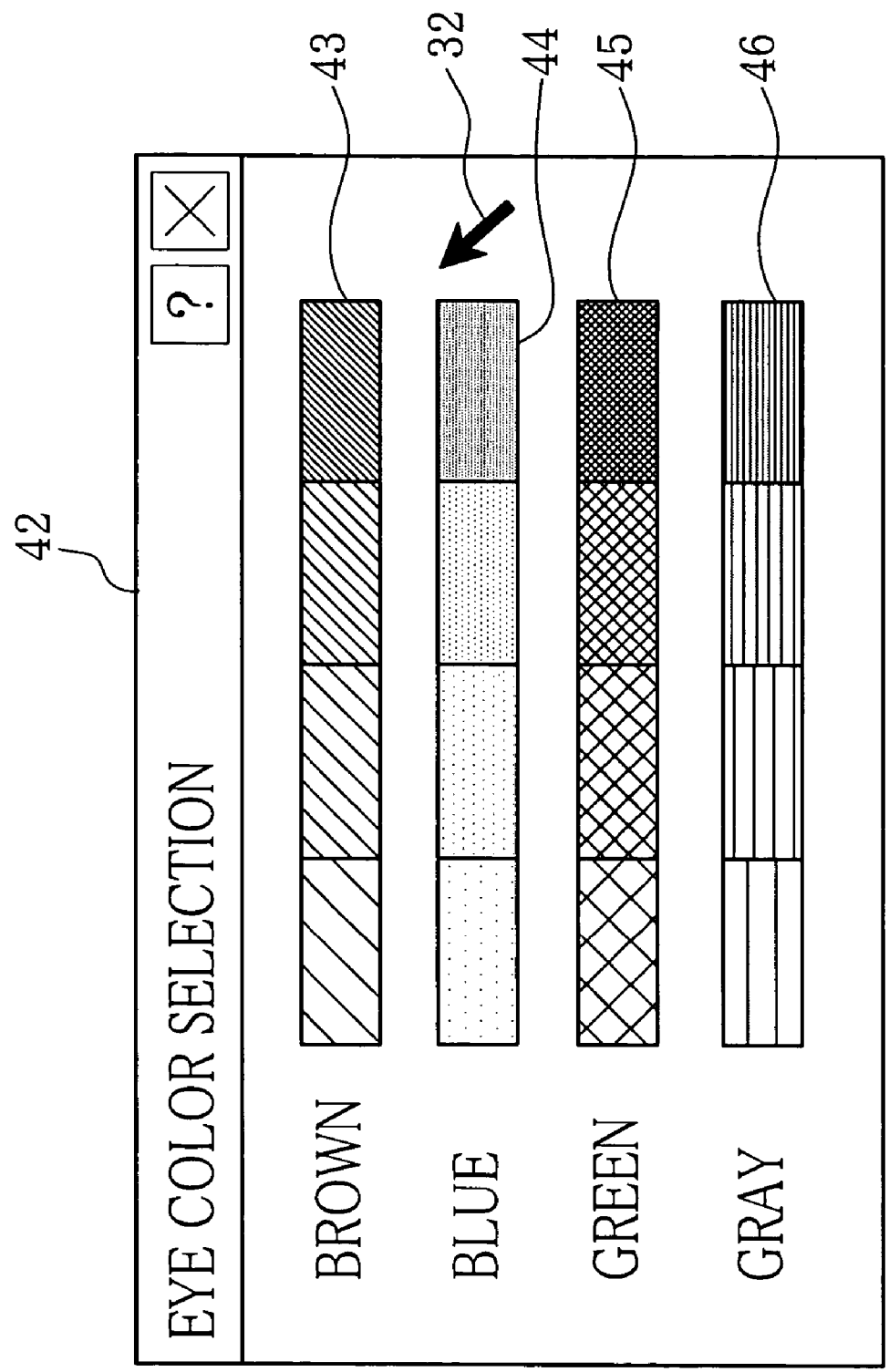

METHOD AND PROGRAM FOR CORRECTING FACIAL IMAGE AND RECORDING MEDIUM

BACKGROUND OF THE INVENTION

1. Field of the Invention

The present invention relates to a method and program for correcting a facial image of a person taken by a digital camera.

2. Description of the Background Art

A digital camera records an optical subject image formed by a CCD or the like on a memory such as an internal memory, a memory card and the like. The image photographed by the digital camera is downloaded to, for example, a PC (personal computer), in order to post the image on a World Wide Web home page or print it on a recording paper.

Recently, image correction software is widely used for correcting an image downloaded to a PC. Japanese Patent Laid-Open Publication No. 11-17969, for example, discloses a method for correcting color in which when the skin color becomes greenish or blackish due to lighting in the image, only the hue value of a pixel, which is outside of a predetermined range, is replaced or smoothed to correct the skin color. Japanese Patent Laid-Open Publication No. 11-250227 discloses the technology in which the pixel image is subjected to smoothing only when dispersion of the pixel values of surrounding pixels is small. This technology makes it possible to smoothly correct bumps and dips in skin due to a wrinkle, a pimple and the like, while defining the borders between areas such as eyes and hair which have different colors from each other.

In the ordinary image correction software, however, when plural correction items are selected, each correction has to be carried out item by item. In other words, for example, taking a case of correcting skin color and hair color, first the skin color is corrected, and then the hair color is corrected. The procedure for correcting operation differs from each correction item. Therefore, there are problems that it takes a lot of time to carry out every selected correction item, and the correcting operation is troublesome.

SUMMARY OF THE INVENTION

An object of the present invention is to provide a method and program for correcting a facial image by which the image is corrected for plural correction items with single and simple operation in a short time.

To achieve the above object, a method for correcting a facial image according to the present invention comprises the steps of (a) extracting pixels representing specific areas from the facial image; (b) determining a correction item to be performed out of plural correction items, each of the correction items corresponding to each area; (c) detecting the position of a cursor in the facial image displayed on a monitor; and (d) if a pointed pixel pointed by the cursor is in the area corresponding to the correction item to be executed, subjecting the pointed pixel to correction process that is set in accordance with the correction item.

One of the correction items is skin correction. When the pointed pixel is in a skin area, and the color of the pointed pixel is outside of the range of predetermined skin color, the color of the pointed pixel is corrected. The predetermined skin color is selectable from plural colors.

One of the correction items is red-eye correction. When the pointed pixel is in an eye area, and the color of the pointed pixel is red, the color of the pointed pixel is corrected. The pointed pixel may be corrected to a selected eye color.

One of the correction items is teeth color correction. When the pointed pixel is in a teeth area, and the pointed pixel has color out of the range of predetermined white, the color of the pointed pixel is corrected.

One of the correction items is hair color correction. When the pointed pixel is in a hair area, and the color of the pointed pixel is white, the color of the pointed pixel is corrected. The pointed pixel may be corrected to the same color as another pixel in the hair area. The pointed pixel may be corrected to a selected hair color.

A program for correcting a facial image according to the present invention is capable of causing a computer to perform extracting pixels representing specific areas from the facial image displayed on a monitor; determining a corrected item to be performed out of plural correction items, each of the correction items corresponding to each area; detecting the position of a cursor in the facial image displayed on the monitor; and if a pointed pixel pointed by the cursor is in the area corresponding to the correction item to be executed, subjecting the pointed pixel to correction process that is set in accordance with the correction item.

A recording medium according to the present invention is readable by a computer on which the program of this invention is stored.

According to the present invention, it is possible to correct plural correction items with single and simple operation, so that operability and convenience increase.

BRIEF DESCRIPTION OF THE DRAWINGS

The above objects and advantages of the present invention will become easily understood by one of ordinary skill in the art when the following detailed description would be read in connection with the accompanying drawings.

FIG. 5 is an explanatory view of an eye color selection window.

PREFERRED EMBODIMENTS OF THE INVENTION

First Embodiment

Figure 1:
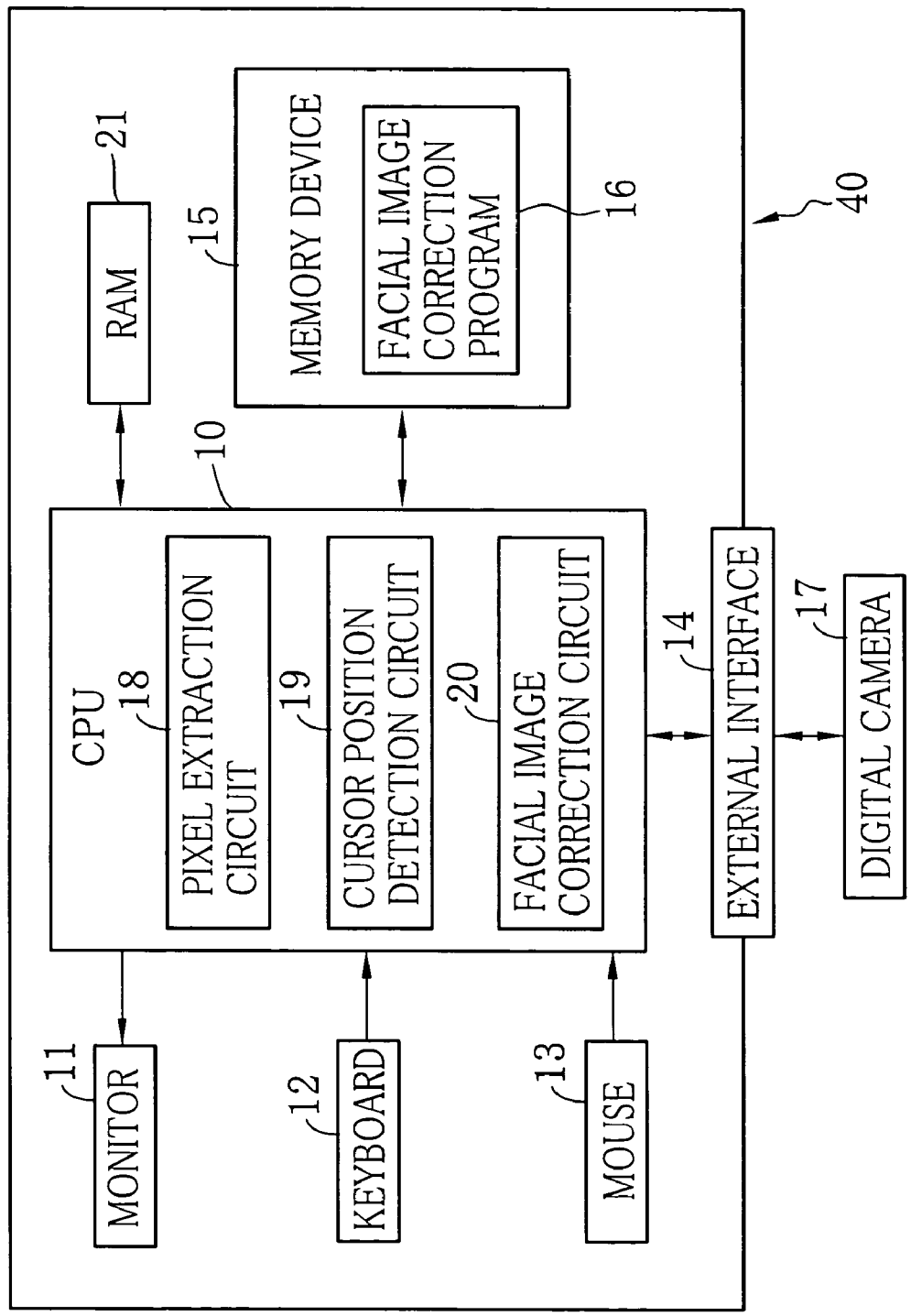
FIG. 1 is a block diagram of a PC.

Referring to FIG. 1, a PC (personal computer) 40 comprises a CPU 10, a monitor 11, a keyboard 12, a mouse 13, an external interface 14, a memory device 15 and a RAM 21. The PC 40 is connected to a digital camera 17 through the external interface 14.

The memory device 15 may be an external memory such as a floppy disk, CD-ROM or DVD-ROM, or may be an internal memory such as an integrated hard disk. A facial image correction program 16 stored on the memory device 15 is read by the CPU 10, and is loaded into the RAM 21. When the CPU 10 gets access to the facial image correction program 16 in the RAM 21, facial image correction process starts. The facial image correction program 16, as described later in detail, makes the PC 40 correct for various correction items in a facial image photographed by the digital camera 17. The CPU 10 controls the whole operation of the PC 40. The CPU 10 comprises a pixel extraction circuit 18, a cursor position detection circuit 19, and a facial image correction circuit 20.

Figure 2:
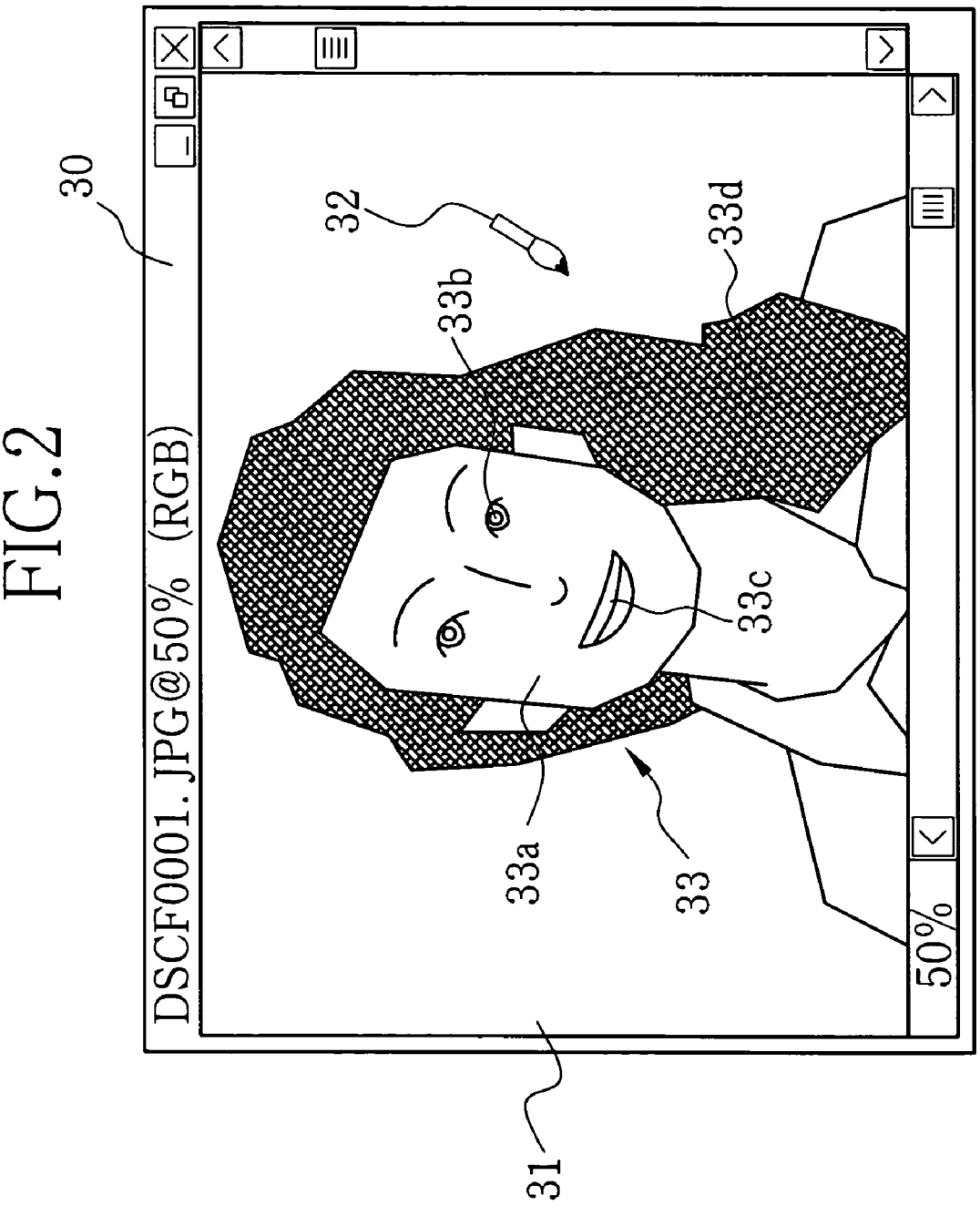
FIG. 2 is an explanatory view of a facial image displayed on a correction window.
Figure 3:
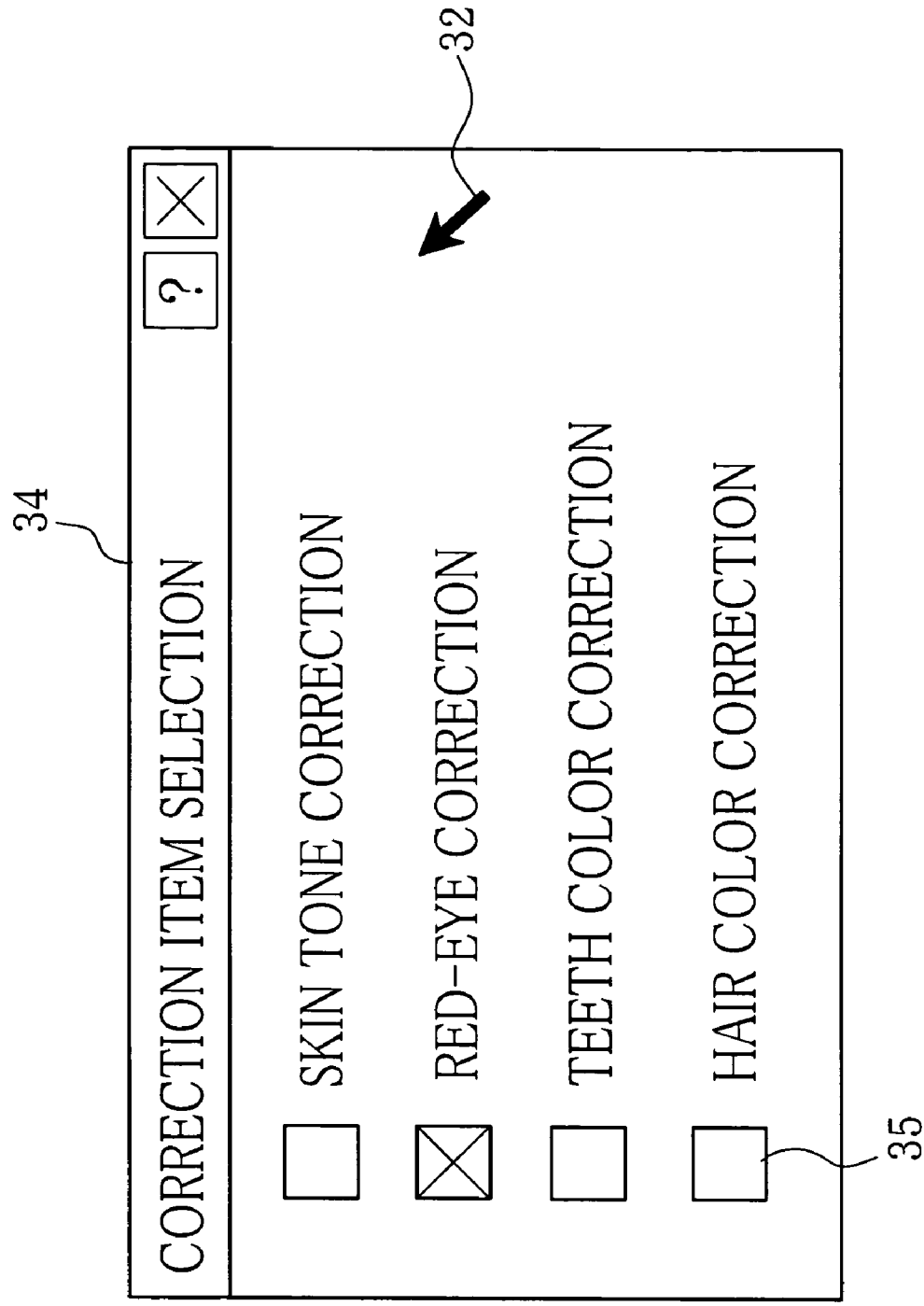
FIG. 3 is an explanatory view of a correcting item selection window.

When the facial image correction program 16 starts, a correction window 30 shown in FIG. 2 and a correction item selection window 34 shown in FIG. 3 are displayed side by side on the monitor 11. Referring to FIG. 2, a cursor 32 in the shape of, for example, a brush appears in the correction window 30. When a facial image 31 to be subjected to correction processing is open in the correction window 30, the pixel extraction circuit 18 extracts pixels representing a skin area 33a, an eye area 33b, a teeth area 33c, and a hair area 33d as follows.

By receiving image data of the facial image 31 which consists of luminance signals Y and chromatic signals Cb and Cr, the pixel extraction circuit 18 carries out raster scan of image data of the two-dimensional original image. If the difference in luminance "ΔY" between two adjoining pixels is smaller than a predetermined threshold value, and the difference "ΔC" between the chromaticities Cb and Cr or the difference "ΔH" between chromaticity angles is smaller than a predetermined threshold value, the adjoining pixels are in the same area. Otherwise, on the other hand, the adjacent pixels are grouped into different areas. The pixel extraction circuit 18 divides the facial image 31 into the areas 33a to 33d by successively repeating the foregoing comparison. When the facial image 31 consists of RGB signals, instead of luminance signals Y and chromatic signals Cb and Cr, the RGB signals may be used.

Then, the pixel extraction circuit 18 calculates the number of pixels, an average luminance Y, an average chromaticity Cb, an average chromaticity Cr, average coordinates (x, y) and the like of each area. The pixels representing the skin area 33a, the eye area 33b, the teeth area 33c and the hair area 33d are determined on the basis of geometric information such as the size and position of each area and the distance among the areas. Besides, the pixel extraction circuit 18 may determine the areas 33a to 33d by extracting the characteristic parts of a face such as eyes, nostrils, the ends of a lip and the like. USP 2001/0005222, referring to the pixel extraction method in detail, is hereby incorporated by reference.

Referring to FIG. 3, desired correction item(s) is/are selectable out of four correction items, those are, "skin tone correction", "red-eye correction", "teeth color correction", and "hair color correction" in the correction item selection window 34. Putting the cursor 32 on a check box 35 of each correction item and clicking the mouse 13 make it possible to select the corresponding correction item.

The cursor position detection circuit 19 detects the position of the cursor 32 in the correction window 30, and outputs a position signal to the facial image correction circuit 20. When the cursor 32 is in one of the above areas 33a to 33d, and the correction item corresponding to the area 33a to 33d is selected, the facial image correction circuit 20 corrects a pixel pointed by the cursor 32.

To be more specific, when the cursor 32 is in the skin area 33a, and the correction item of "skin tone correction" is selected, the facial image correction circuit 20 compares the luminance Y and chromaticities Cb, Cr of the pixel, which the cursor 32 is pointing at, with those of predetermined target skin color. If the differences in luminance Y and chromaticities Cb, Cr are in the predetermined ranges, the facial image correction circuit 20 judges that correction is unnecessary. Otherwise, the color of the pixel is corrected in accordance with the correction amounts which are determined in proportion to the differences in luminance Y and chromaticities Cb, Cr, in order to actualize preferable skin tone.

When the cursor 32 is in the eye area 33b, and "red-eye correction" is selected, the facial image correction circuit 20 compares the luminance Y and chromaticities Cb, Cr of the pixel, which the cursor 32 is pointing at, with those of predetermined red color. If the differences in luminance Y and chromaticities Cb, Cr are outside of predetermined ranges, the facial image correction circuit 20 judges that correction is unnecessary. Otherwise, the color of the pixel is replaced with predetermined brown color to correct red-eye.

As in the case of "skin tone correction", when the cursor 32 is in the teeth area 33c, and "teeth color correction" is selected, the facial image correction circuit 20 compares the luminance Y and chromaticities Cb, Cr of the pixel, which the cursor 32 is pointing at, with those of predetermined target white color. If the differences in luminance Y and chromaticities Cb, Cr are within the predetermined ranges, the facial image correction circuit 20 judges that correction is unnecessary. Otherwise, the color of the pixel is replaced with predetermined white color to correct teeth color.

As in the case of the "red-eye correction", when the cursor 32 is in the hair area 33d, and "hair color correction" is selected, the facial image correction circuit 20 compares the luminance Y and chromaticities Cb and Cr of the pixel, which the cursor 32 is pointing at, with those of predetermined white color. If the differences in luminance Y and chromaticities Cb and Cr are outside of the predetermined ranges, the facial image correction circuit 20 judges that correction is unnecessary. Otherwise, the facial image correction circuit 20 extracts hair color other than white in the vicinity of the pixel within the hair area 33d, to replace the color of the pixel with the extracted hair color.

Figure 4:
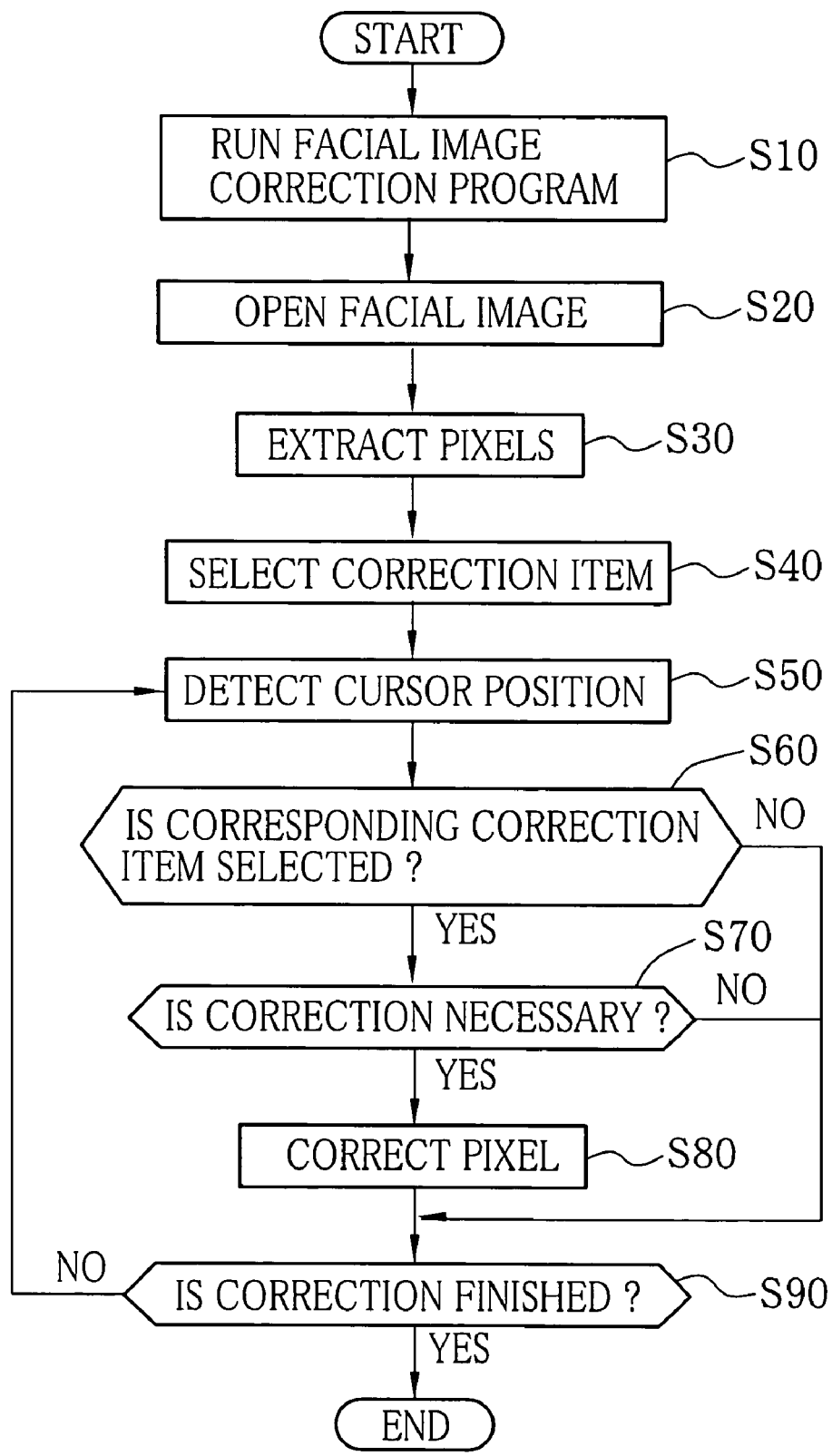
FIG. 4 is a flow chart of a facial image correction program according to the present invention.

The operation of the facial image correction program 16 will be hereinafter described with referring to FIG. 4. An image taken by the digital camera 17 is stored on an internal memory such as the RAM 21, HDD, or the like. When the facial image correction program 16 runs (S10), the correction window 30 and the correction item selection window 34 open on the monitor 11. The user opens the facial image 31 to be corrected out of downloaded images in the correction window 30 (S20), and the pixel extraction circuit 18 extracts pixels representing the skin area 33a, the eye area 33b, the teeth area 33c, and the hair area 33d (S30). Then, one or plural correction item is/are selected in the correction item selection window 34 (S40).

The cursor position detection circuit 19 detects the position of the cursor 32 in the correction window 30 (S50). When the cursor 32 is in one of the skin area 33a, the eye area 33b, the teeth area 33c, and the hair area 33d, the facial image correction circuit 20 judges whether the correction item corresponding to the position of the cursor 32 is selected (S60). When the corresponding correction item is selected, whether correction is necessary or not is judged in accordance with the color of the pixel which the cursor 32 is pointing at (S70). If the correction is necessary, predetermined correction processing is carried out (S80).

When the correction item corresponding to the position of the cursor 32 is not selected in step S60, or the correction is judged to be unnecessary in step S70, the correction processing (S80) is not carried out. Steps from S50 to S80 are repeated until the user finishes the whole correction.

Although only the single pixel which the cursor 32 is pointing at is corrected in the above embodiment, all pixels belonging to an area in which the cursor 32 is sitting may be corrected at a time. In this case, it is possible to efficiently carry out the correction in a short time.

In the above first embodiment, the color of the eye area 33b is replaced with brown in "red-eye correction". In "skin tone correction", the necessity of correction is judged on the basis of whether the color of the skin area 33a is in the predetermined range of target skin color. The method according to the first embodiment is applicable in a region such as Asia in which almost all users have similar eye colors and skin colors. The method according to the first embodiment, however, is not sufficient in a region such as Europe and America, in which users have various eye colors, skin colors, and hair colors. A method for correcting a facial image which is adaptable to various eye colors, skin colors, and hair colors will be hereinafter described as the second embodiment.

Second Embodiment

In the second embodiment, the facial image 31 photographed by the digital camera 17 is downloaded to the PC 40. As in the case of the first embodiment, when the facial image correction program 16 starts, the correction window 20 and the correction item selection window 34 open.

When a user selects, for example, "red-eye correction" from the correction item selection window 34, an eye color selection window 42 opens (refer to FIG. 5). A brown color palette 43, a blue color palette 44, a green color palette 45, and a gray color palette 46 are displayed in the eye color selection window 42. In the brown color palette 43, browns with four-step gradation in color from light brown to dark brown are displayed. Just as with the browns, blues, greens, and grays with four-step gradation in color are displayed in the blue, green, and gray color palettes 44 to 46, respectively. Since the user selects a color close to that of his/her eyes from the color palettes 43 to 46, the selected color is used in "red-eye correction".

Similarly, when "skin tone correction" is selected in the correction item selection window 34, a skin color selection window (not illustrated) opens. Various skin colors are displayed in the skin color selection window, so that a user can select a color close to that of his/her skin. The selected skin color is used as reference color or correction color in the correction processing.

Using the foregoing eye color selection window 42 and the skin color selection window makes it possible to correct the facial image 31 with the desired eye color and skin color. Therefore, it is possible that the facial image 31 is so corrected as to have a good complexion by selecting a skin color brighter than actual one, or as to have different eye color from actual one for fun.

If a hair color selection window (not illustrated) is used in "hair color correction", the facial image 31 is corrected with hair color different from actual one. Therefore, it is possible for a user with white hair to correct his/her hair with desired color, or for a user with colored hair to select a hair color different from actual one for fun.

In the above embodiments, the method and program for correcting a facial image according to the present invention are applied to the PC 40. The present invention, however, is applicable to other types of electric equipment such as PDA and the like. If a color printer which prints an image directly downloaded from a digital camera is provided with a touch panel or the like, the present invention is applicable to the color printer. The types of correction items are not limited to four described above, but are properly addable and changeable.

Although the present invention has been described with respect to the preferred embodiments, the present invention is not limited to the above embodiments but, on the contrary, various modifications will be possible to those skilled in the art without departing from the scope of claims appended hereto.

What is claimed is:

1. A method for correcting a facial image displayed on a monitor, said method comprising:
   extracting pixels representing a plurality of specific facial feature areas from said facial image;
   selecting a correction item to be performed out of plural correction items, each of said plural correction items corresponding to each of said plurality of specific facial feature areas;
   detecting a position of a cursor in said facial image displayed on said monitor; and
   if a pixel pointed to by said cursor is in one of said plurality of specific facial feature areas corresponding to said previously selected correction item to be performed, subjecting said pointed to pixel to a correction process in accordance with said previously selected corresponding correction item,
   wherein specific facial feature areas comprise a skin area, an eye area, a teeth area, and a hair area, and
   wherein said plural correction items comprise skin color correction, red-eye color correction, teeth color correction, and hair color correction.

2. A method as recited in claim 1, wherein when said skin color correction is selected, wherein when said pointed to pixel is in a skin area and a color of said pointed to pixel is outside of a range of predetermined skin color, a color of said pointed to pixel is corrected.

3. A method as recited in claim 2, wherein said skin color correction is selectable from plural colors.

4. A method as recited in claim 1, wherein when said red-eye color correction is selected, wherein when said pointed to pixel is in an eye area and a color of said pointed to pixel is red, the color of said pointed to pixel is corrected.

5. A method as recited in claim 4, wherein said pointed to pixel is corrected to a selected eye color.

6. A method as recited in claim 1, wherein when said teeth color correction is selected, wherein when said pointed to pixel is in a teeth area and said pointed to pixel has a color out of a range of predetermined white, a color of said pointed to pixel is corrected.

7. A method as recited in claim 1, wherein when said hair color correction is selected, wherein when said pointed to pixel is in a hair area and a color of said pointed to pixel is white, the color of said pointed to pixel is corrected.

8. A method as recited in claim 7, wherein said pointed to pixel is corrected to a same color as another pixel in said hair area.

9. A method as recited in claim 1, wherein one of said correction items comprises hair color correction, and said pointed to pixel is corrected to a selected hair color.

10. A programmable storage medium tangibly embodying a program of machine-readable instructions executable by a digital processing apparatus to perform operations supporting correcting a facial image, the operations comprising:
    extracting pixels representing a plurality of specific facial feature areas from said facial image displayed on a monitor;
    selecting a correction item to be performed out of plural correction items, each of said plural correction items corresponding to each of said plurality of specific facial feature areas;
    detecting a position of a cursor in said facial image displayed on said monitor; and if a pixel pointed to by said cursor is in one of said plurality of specific facial feature areas corresponding to said previously selected correction item to be performed, subjecting said pointed to pixel to a correction process in accordance with said previously selected corresponding correction item, wherein specific facial feature areas comprise a skin area, an eye area, a teeth area, and a hair area, and wherein said plural correction items comprise skin color correction, red-eye color correction, teeth color correction, and hair color correction.

11. A method for correcting a facial image displayed on a monitor, said method comprising:

extracting pixels from a plurality of specific facial feature areas from said facial image based on facial features identified in said facial image;

providing a plurality of image correction items, each of said plurality of image correction items corresponding to each of said plurality of specific facial feature areas;

selecting one of said plurality of image correction items;

determining a corresponding one of said plurality of specific facial feature areas based on said selected one of said plurality of image correction items;

detecting a position of a cursor in said facial image displayed on said monitor; and correcting a pixel in said facial image in accordance with said selected one of said plurality of image correction items, said pixel corresponding to said position of said cursor when said position of said cursor is in said corresponding one of said plurality of specific facial feature areas, wherein said plurality of image correction items further comprises:
 a skin color correction item;
 an eye color correction item;
 a teeth color correction item; and
 a hair color correction item, and wherein each image correction items corresponds respectively to said plurality of specific facial features that further comprises:
 a skin feature area;
 an eye feature area;
 a teeth feature area; and
 a hair feature area.

12. The method according to claim 11, wherein said extracting pixels from said plurality of specific facial feature areas further comprises:

identifying said facial features in said facial image; and dividing said facial image into said plurality of specific facial feature areas based on said identified facial features.

13. The method according to claim 12, wherein said identifying said facial features further comprises:

determining said facial features on a basis of geometric information comprising at least one of facial feature size, a position of each specific facial feature area with respect to said facial image, and a distance between said specific facial feature areas.

14. The method according to claim 11, wherein said selecting one of said plurality of image correction items further comprises:

displaying a list of said plurality of image correction items.

15. The method according to claim 11, wherein said correcting said pixel further comprises:

comparing luminance Y and chromaticities Cb, Cr of said pixel with luminance Y' and chromaticities Cb', Cr' of a predetermined target skin color, when said cursor is in a skin feature area and said selected one of said plurality of image correction items comprises a skin color correction item.

16. The method according to claim 11, wherein said correcting said pixel further comprises:

comparing luminance Y and chromaticities Cb, Cr of said pixel with luminance Y' and chromaticities Cb', Cr' of a predetermined target eye color, when said cursor is in an eye feature area and said selected one of said plurality of image correction items comprises an eye color correction item.

17. The method according to claim 11, wherein said correcting said pixel further comprises:

comparing luminance Y and chromaticities Cb, Cr of said pixel with luminance Y' and chromaticities Cb', Cr' of a predetermined target teeth color, when said cursor is in a teeth feature area and said selected one of said plurality of image correction items comprises a teeth color correction item.

18. The method according to claim 11, wherein said correcting said pixel further comprises:

comparing luminance Y and chromalities Cb, Cr of said pixel with luminance Y' and chromaticities Cb', Cr' of a predetermined target hair color, when said cursor is in a hair feature area and said selected one of said plurality of image correction items comprises a hair color correction item.

* * * * *